SANDBLASTER FOR FLOORS

Original Filed Aug. 29, 1966 5 Sheets-Sheet 1

INVENTORS
ANTHONY E. CODINA
GEORGE C. PUNTON
BY
Zalewski, Patton, Rieber, Lee & Utecht
ATTORNEYS

SANDBLASTER FOR FLOORS

Original Filed Aug. 29, 1966 5 Sheets-Sheet 2

INVENTORS
ANTHONY E. CODINA
GEORGE C. PUNTON
BY Zulwiler, Patton, Riebe, Lee & Klatt
ATTORNEYS

SANDBLASTER FOR FLOORS

Original Filed Aug. 29, 1966 5 Sheets-Sheet 5

INVENTORS
ANTHONY E. CODINA
GEORGE C. PUNTON
BY
ATTORNEYS

SANDBLASTER FOR FLOORS

Original Filed Aug. 29, 1966 5 Sheets-Sheet 4

INVENTORS
ANTHONY E. CODINA
GEORGE C. PUNTON
BY
Fulwider, Patty, Bishop, Lee & Utecht
ATTORNEYS

SANDBLASTER FOR FLOORS

Original Filed Aug. 29, 1966 5 Sheets-Sheet 5

INVENTORS
ANTHONY E. CODINA
GEORGE C. PUNTON

BY Fulwider Patton Rieber, Lee & Utecht

ATTORNEYS

United States Patent Office

Re. 27,314
Reissued Mar. 21, 1972

27,314
SANDBLASTER FOR FLOORS

Anthony E. Codina and George C. Punton, San Diego County, Calif., assignors to Marine & Industrial Coatings Co., San Diego, Calif.

Original No. 3,407,538, dated Oct. 29, 1968, Ser. No. 575,616, Aug. 29, 1966. Application for reissue Nov. 26, 1969, Ser. No. 888,175
Int. Cl. B24c *3/06*
U.S. Cl. 51—8 4 Claims

Matter enclosed in heavy brackets [ ] appears in the original patent but forms no part of this reissue specification; matter printed in italics indicates the additions made by reissue.

ABSTRACT OF THE DISCLOSURE

The present invention relates to a sandblasting mechanism of the type in which sand is ejected under pressure from the nozzle of a hose.

SUMMARY OF THE INVENTION

Prior to the advent of the present invention, the sand ladened air and the debris removed by the blasting were permitted to escape into the atmosphere. Therefore, such sandblasting equipment was limited in its use to areas in which the sand and debris were not detrimental to the environs, and could not be used in areas in which the presence of sand and debris in the air was detrimental to, for example, machinery and control instruments. An example is that of aircraft carriers, the decks of which become covered with oils, greases and other debris.

The present invention comprises sandblasting mechanism, which includes walls, which in conjunction with the surface to be cleaned, for example a floor, form a closed housing. A conduit for sand an air under pressure extends into the housing. The end of the conduit is provided with a nozzle. A man in the housing manipulates the nozzle to clean the surface. He wears a mask and is supplied with air through a conduit leading from the exterior of the housing. The housing is provided with an outlet opening for sand, air and the removed debris, and this outlet is connected with a source of reduced pressure for withdrawing the sand, air and debris.

A resilient and flexible seal, such as sponge rubber, is interposed between the walls of the housing and the surface to be cleaned to prevent the escape of sand and debris ladened air at the junction of the walls and that surface. Inasmuch as the impingement of sand on the seal would cause a wearing away of the sealing material, a resilient and flexible skirt is disposed inwardly of the sealing material. This skirt is formed preferably of a hard surface rubber which substantially withstands the bombardment of the sand thereon.

The housing is supported on gliders or rollers. It can be raised and lowered relative to the supports. When in the lowermost position, the sealing material is pressed against the surface (floor) to be cleaned, and when it is raised, the sealing material is spaced from the said surface, whereby the man in the housing can manipulate the housing, i.e., move it from place to place.

Other features and the advantages of the present invention will be apparent from the following description, reference being had to the accompanying drawings wherein a preferred embodiment of the invention is illustrated.

Figure 2:
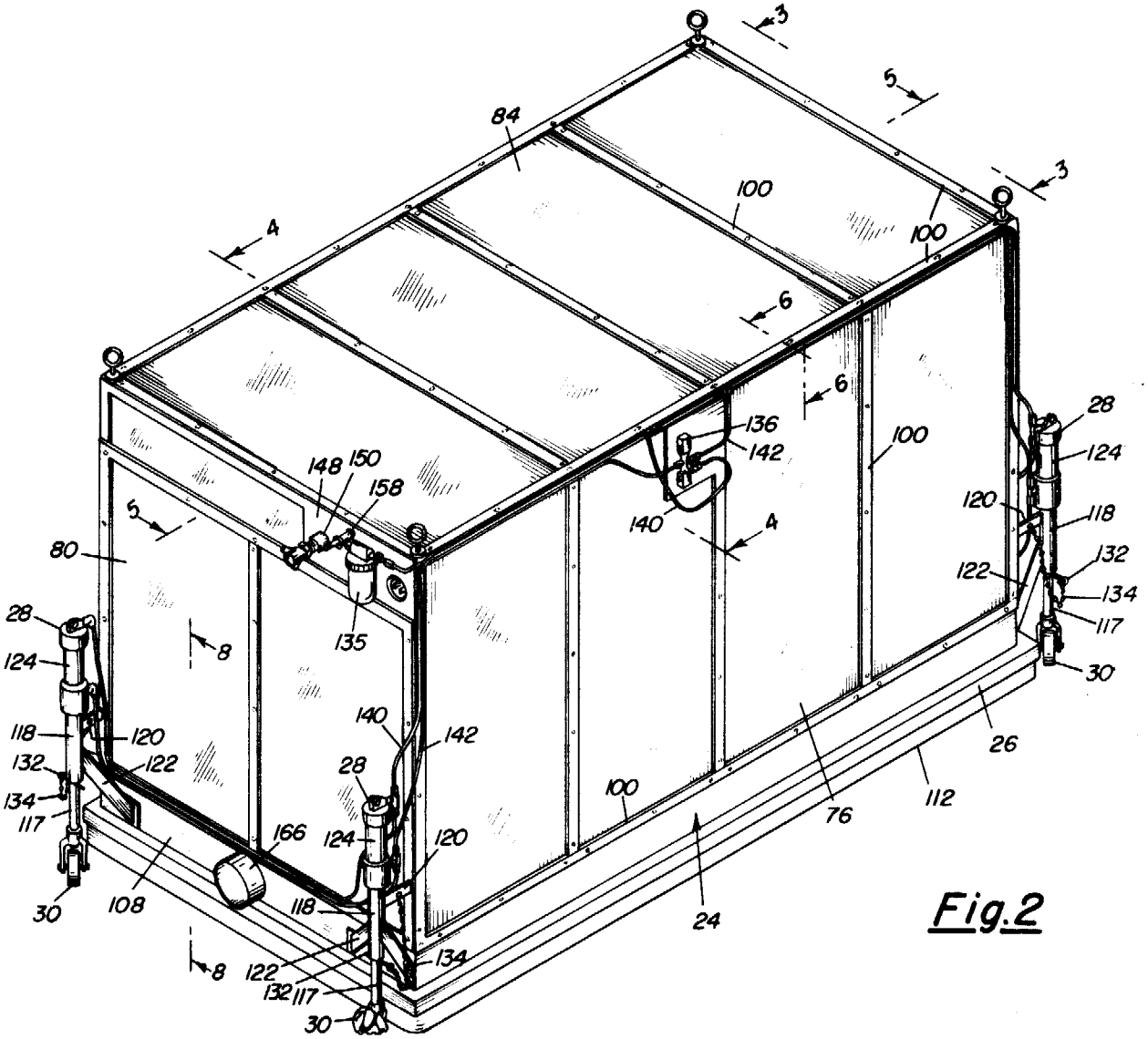
FIG. 2 is a perspective view of the housing shown in FIG. 1, but on a larger scale and showing the housing in its elevated position.
Figure 4:
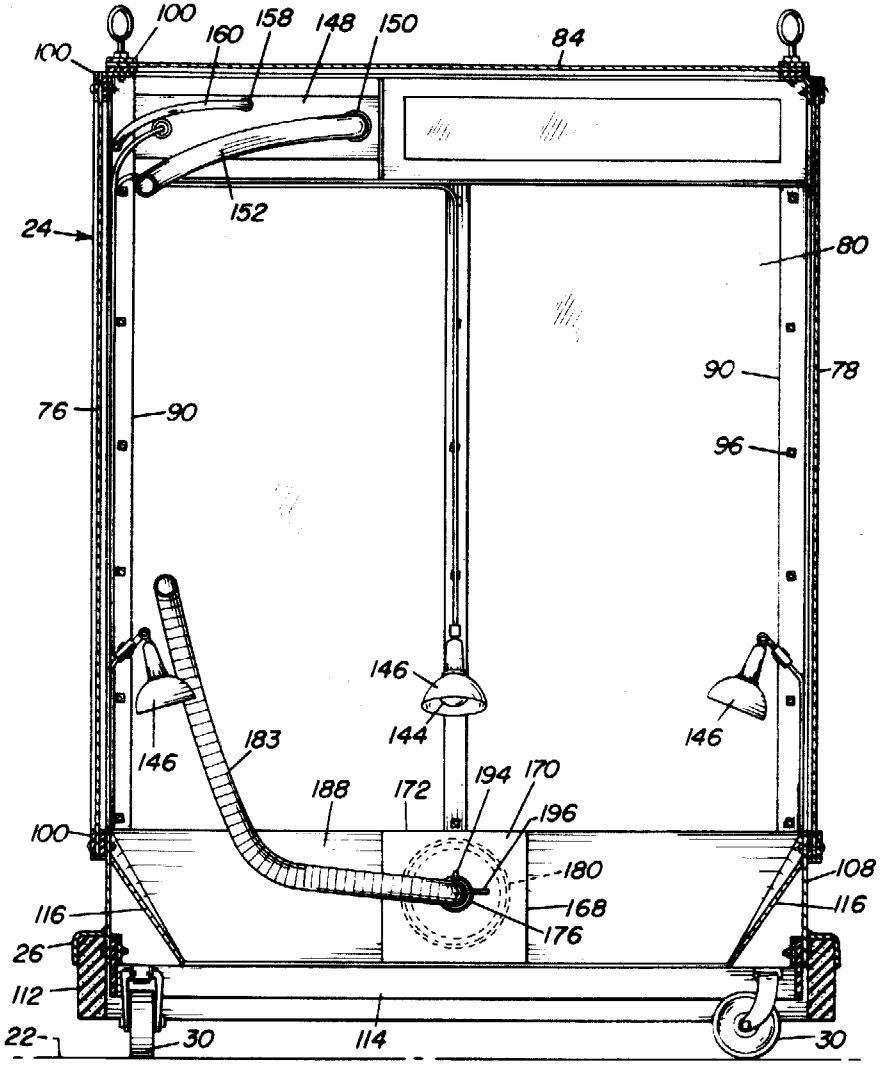
Figure 3:
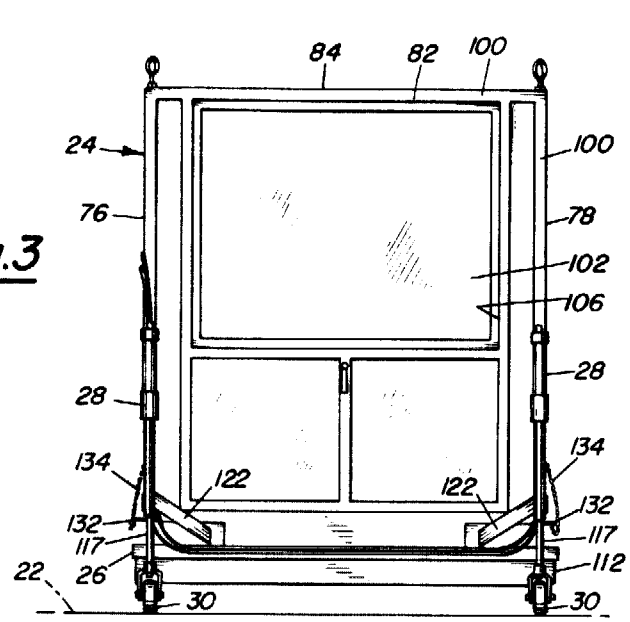
Figure 6:
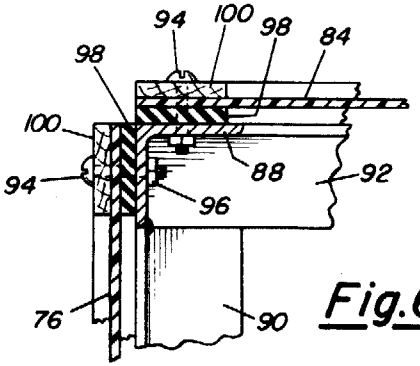
Figure 5:
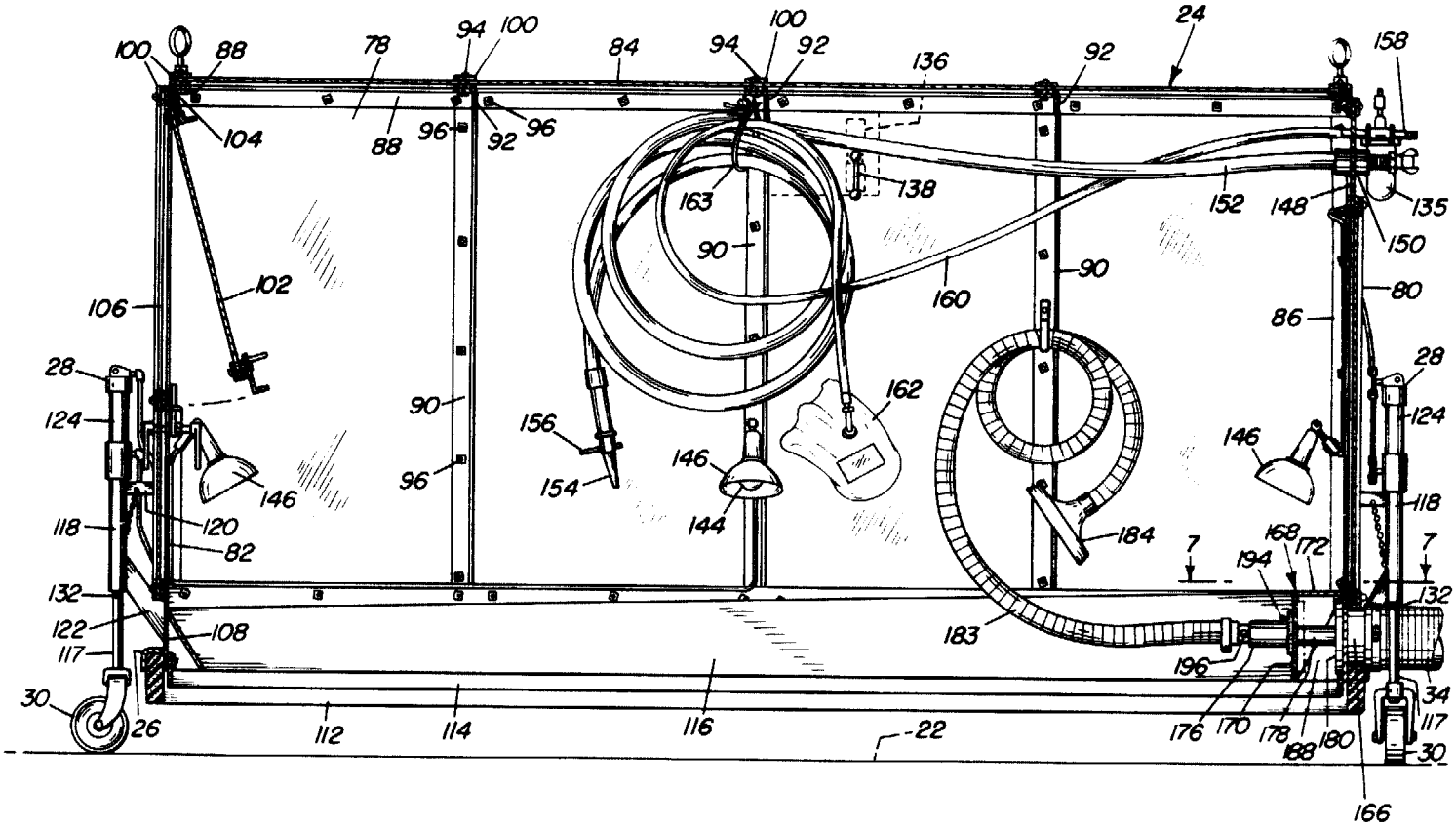
Figure 8:
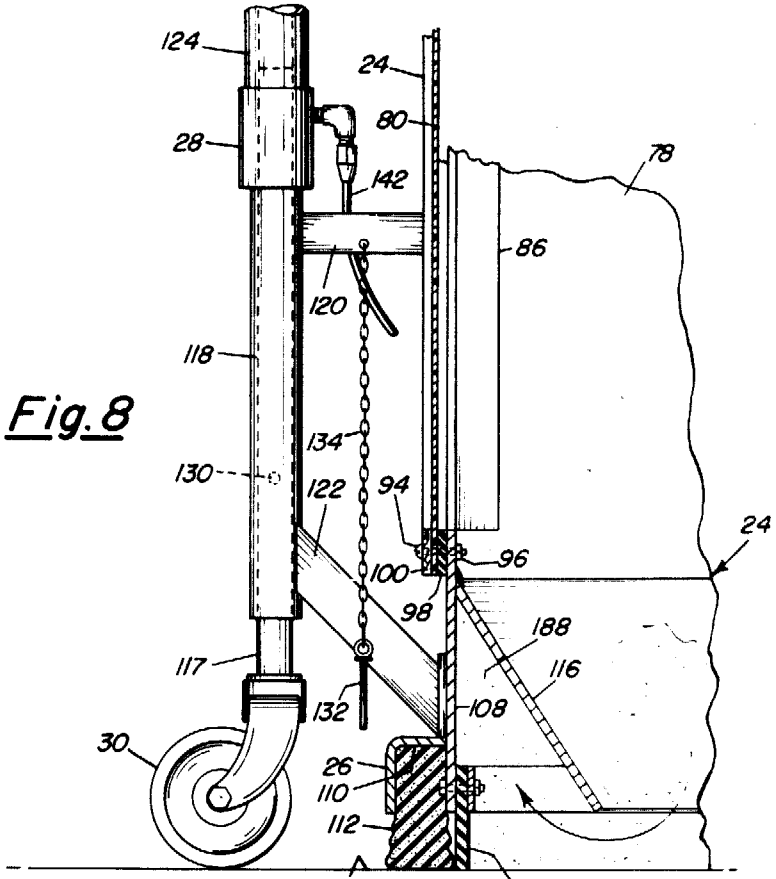
Figure 7:
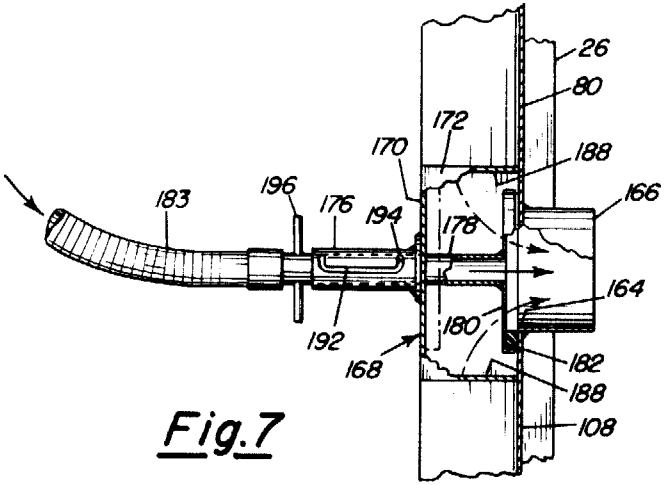
Figure 9:
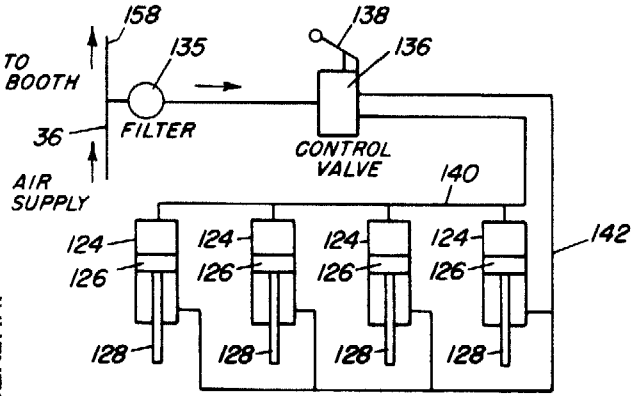

FIGS. 3, 4, 5 and 6 are sectional views, taken along lines 3—3, 4—4, 5—5, and 6—6 of FIG. 2, the view in FIG. 6 being on a larger scale;

FIG. 7 is a fragmentary, sectional view taken along line 7—7 of FIG. 5, but on a larger scale;

FIG. 8 is a fragmentary view, partly in section, the section being taken along line 8—8 of FIG. 2, but on a larger scale and showing the housing in its lowered position; and FIG. 9 is a diagrammatic view of the air supply system for the operator in the housing and the pneumatic system for raising and lowering the housing.

DESCRIPTION OF THE PREFERRED EMBODIMENT

Figure 1:
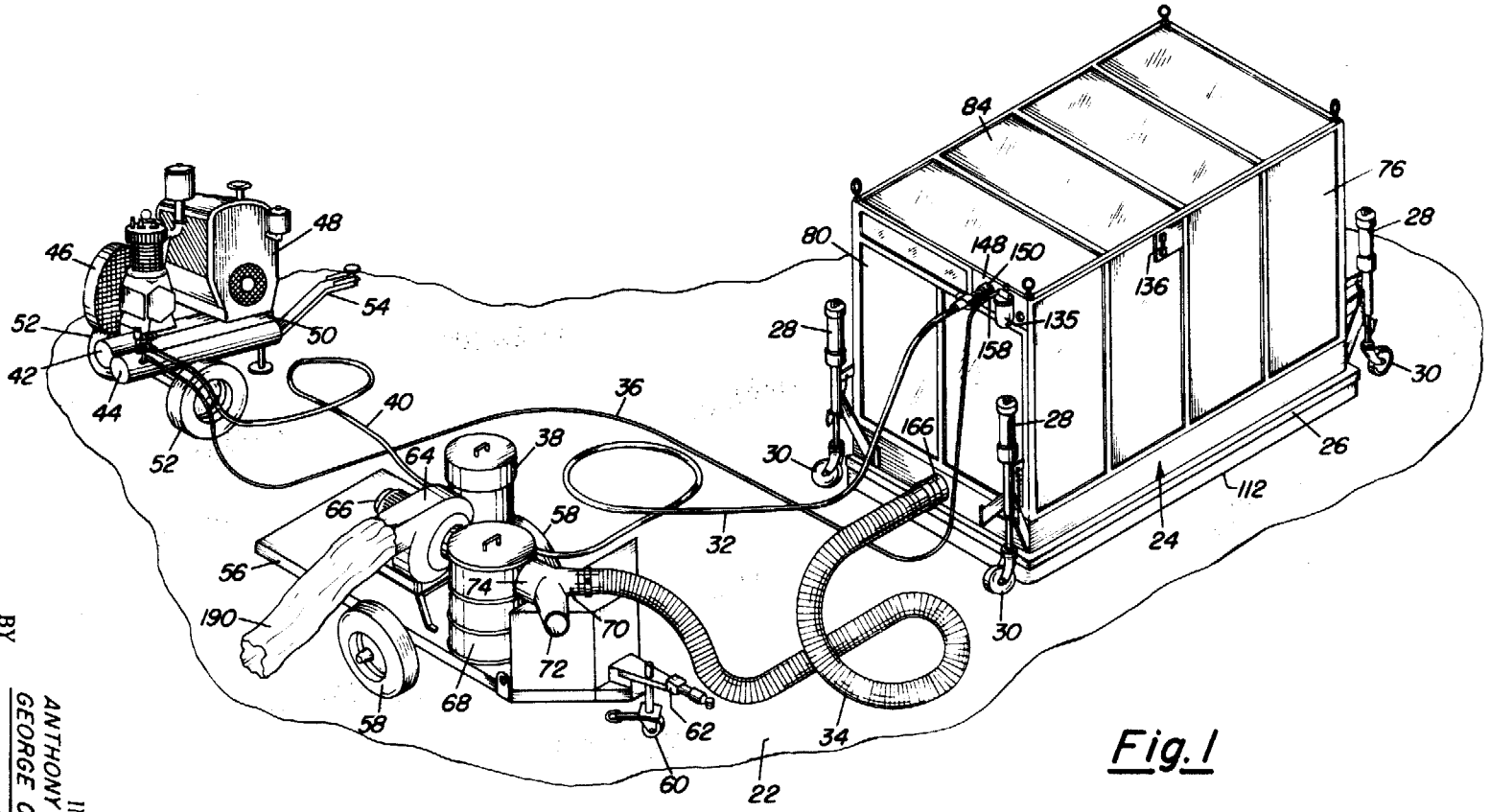
FIG. 1 is a perspective view of the sandblasting mechanism, showing the housing resting on the surface to be cleaned, and also showing the mechanism for creating the necessary pressure for ejecting air and sand under pressure to the housing, and further showing the mechanism for withdrawing the sand, air and debris from the housing.

Referring generally to the drawings, and particularly to FIG. 1, the entire mechanism rests on a floor 22 constituting, for example, the surface to be cleaned. The housing 24 is closed when it rests on the floor, it being sealed to the floor by a resilient and flexible skirt 26. It is adapted to be elevated by four elevators 28, one at each corner of the housing, and when elevated, it is supported by floor engaging supports such as girders or as herein shown, by rollers 30 of casters. Air and sand is injected under pressure into the housing through a flexible conduit 32. Air, sand and debris is withdrawn from the housing through a flexible conduit or tube 34. Air for the workman inside the housing and for elevating and lowering the housing is supplied by a flexible conduit 36.

The air and sand are supplied to the conduit 32 from a sand container 38 and air under pressure is supplied to the container to pick up the sand in the well known manner by a conduit 40 which receives the air from a tank 42. Air is supplied to conduit 36 by a tank 44. These tanks are supplied with air from an air pump 46 which is driven by a motor in the form of an internal combustion engine 48. The tank, pump and engine are in the form of a unit including a cart 50 having wheels 52 and a tongue 54.

The sand tank 38 rests upon a cart 56 having wheels 58, a front roller 60 and a tongue 62. The cart 56 carries a suction fan 64 which is driven by a motor 66. This fan withdraws air from a sand and air separator 68, the separator functioning as a settling tank for the sand which is withdrawn from the housing 24 through tube 34. The end of tube 34 is connected with the separator through one of two inlets 70 and 72 of a coupling 74. The second inlet 72 is employed when the mechanism is connected to two housings such as 24. Inlet 72 is shown as in the closed position.

Referring more in detail to the drawings, it will be seen that the housing 24 comprises two side walls which, for convenience sake will be referred to as the right side wall 76 and the left side wall 78, a front wall 80, a rear wall 82 and a top wall or ceiling 84. As is more clearly shown in FIG. 6, the framework for the housing comprises upright angle irons 86 at each of the corners, which are suitably connected with horizontally extending angle irons 88. Intermediate angle irons 90 are also provided, which are connected with the angle irons 88. The top is also re-enforced by angle irons 92 intermediate the end angle irons 86. The side walls 76 and 78, the end walls 80 and 82 and the top wall 84 are formed of transparent material and are in the form of panels. These panels are fastened to the angle irons by bolts 94 and nuts 96, there being resilient sealing material 98 disposed between the angle irons and the panels. The bolts 94, in addition to extending through the panels and the sealing material 98, also extend through battens 100.

The rear wall 82 includes a door 102 which is hinged at 104 to an upper angle iron 88. This door is for closing the opening 106 through which the workman can pass. Suitable latching mechanism is provided for holding the door in sealed relationship with the rear wall.

As is more clearly shown in FIG. 8, the bottom of the housing 24 includes a metallic skirt 108 which surrounds the bottom of the housing and is fastened to one of the battens 100 by bolts 94 and nuts 96. The bottom of the skirt 108 forms a socket 110 for carrying a sealing material 112 such as sponge rubber, which seals the entire housing with the floor when the housing is in its lowermost position. A second skirt 114 extends from the skirt 108 and is suitably fastened thereto in any manner. This skirt 114 is formed of resilient and flexible material, but has a considerably harder surface than the skirt 112. This skirt 114 shields the skirt 112 from the direct impact of the sand. This is necessary since the skirt 112 is formed of material which is subject to considerable wear where it is subjected to the impact of the sand. A metallic guard 116 is connected with all of the lower sides of the skirt 108 and further aids in preventing the impact of the sand upon the skirts 112 and 114.

As is more clearly shown in FIG. 8, the rollers 30 are in the form of casters. The stem 117 of a caster extends into a guide 118 and this guide is supported by corner angle irons and the skirt 108 of the housing through brackets 120 and 122. The guide 118 carries a cylinder 124 containing a piston 126 (see diagrammatic view, FIG. 9. A ram 128 is fastened to the piston 126, and the lower end thereof abuts the top of the stem 117. When air under pressure is admitted to the top of the cylinders 124, all of the cylinders 124 will be raised simultaneously, carrying with them the housing 24, through the brackets 120 and 122. A pin hole 130 is provided in each of the stems 117 which is adapted to receive a pin 132 which is carried by a chain 134. When the pins 132 are in the holes 130, as is shown more clearly in FIG. 2, the housing 24 is held in elevated position mechanically through the pins. When the pins 132 are withdrawn from the holes 130 and pressure is applied to the bottom of the cylinders and released from the top of the cylinders, the pressure of the air on the bottom of the piston 126 augments the weight of the housing to thereby provide for quickly lowering the housing from the position shown in FIG. 2 to the position shown in FIG. 8.

The pneumatic system is shown diagrammatically in FIG. 9, in which the air from the air supply line 36 flows through filter 135 to a control valve 136. When the handle 138 of the control valve is in one position, air is admitted through the tops of the cylinders 124 by a tube 140 and released from the bottom of the cylinders through a tube 142. When the valve is in another position, air is admitted through the bottom of the cylinders 124 through the tube 142 and is released through the top of the cylinders through the tube 140. When the valve 136 is in a third position i.e., a closed position, air cannot flow to either of the tube 140 or 142.

Lamps 144 and shields 146 therefor, are suitably carried on the interior of the housing for lighting the floor which is to be cleaned.

The upper part of the front wall is in the form of a metallic panel 148. A coupling 150 extends through this panel and the conduit 32 is removably connected with this coupling. A conduit 152 in the form of a flexible hose is connected with the coupling 150 and the end of this conduit is provided with a nozzle 154 which is controlled by a valve 156. The panel 148 also carries a second coupling 158 to which the air conduit 36 is removably connected. A conduit in the form of a flexible hose 160 is connected to the coupling 158 and terminates in a mask 162 which is worn by the workman when in the housing. He is thus provided with air and need not breathe the surrounding air. When the conduits 152 and 160 are not in use, they may be supported by a strap 163, as shown in FIG. 5.

As is seen more clearly in FIG. 7, the rear end of the skirt 108 is provided with an opening 164. An outwardly extending sleeve 166 registers with this opening 164 and the tube 34 is sealed thereto in any suitable manner, thus, air is withdrawn from the housing through the opening 164 and the sleeve 166 and the tube 34. Again referring to FIGS. 5 and 7, the metallic guard or skirt 116 carries a support 168 including a vertical wall 170 and a horizontally extending wall 172 for supporting a cylindrical sleeve 176 for guiding a tube 178. This tube is slidably mounted in the sleeve 176 and one end thereof is in the form of a valve 180 having a resilient seat 182 which is adapted to surround the opening 164. When the tube 178 and the valve 180 are in the position shown in FIG. 7, air cannot be withdrawn from the interior of the housing except through the tube 178. The end of the tube 178, opposite the valve 180 is connected with a suction nozzle 184. However, when the valve is moved to its extreme left position, as viewed in FIG. 7, air is withdrawn from the housing through the open passages 188 and air is not withdrawn from the nozzle 184. It will be observed that the walls 174 of the support 168 angle so as to provide the two passages 188.

In operating the mechanism, the housing 24 and the carts 50 and 56 are moved to the desirable position. Thereafter, the workman enters through the door opening 102 and after closing the same, he actuates the valve 136 through the lever 138, which latter extends into the interior of the housing as shown in FIG. 5. Upon actuating the lever 138, the housing is lowered to the position shown in FIG. 8 in which the sealing skirt 112 is compressed against the floor whereby the walls of the housing together with the floor, provide a closed housing. Thereafter, the engine 48 and the suction fan motor 66 are started to supply the necessary air pressure to the operator wearing the mask and to the conduit for feeding the same under air pressure to the nozzle 154 and air, sand and debris are withdrawn from the housing 24 through the tube 34 by the suction fan 64. A considerable amount of the sand will be retrieved through the separator 68, and the air, which is exhausted from housing 24 together with particles of sand, are conducted through a flexible tube 190 to any remote place where the presence of flowing sand will not be detrimental.

After a predetermined area of the floor is cleaned by the sandblasting the workmen will actuate the valve 136 to raise the compartment so that it rests upon the casters, and, while still in the compartment, he can move the entire compartment to another area that should be cleaned. It will be understood that the conduits 32, 34 and 36 are of sufficient length whereby a large area of the floor can be cleaned without moving the carts 50 and 56.

Thus, it will be seen from the foregoing that inasmuch as the compartment is closed during the sandblasting operation and the sand and debris laden air can be conducted to an area where instrumentality is not present, the present invention is particularly useful in such areas where delicate instruments or machinery are employed. One example of this is on the deck of an airplane carrier.

The auxiliary hose 183 and its nozzle 184 are used to remove excess sand that may be pocketed in a housing on the floor. Referring again to FIG. 7, it will be seen that the sleeve 176 is provided with a U-shaped slot 192 and the tube 178 carries a pin 194 which extends into the slot. The operator through a handle 196, can turn the tube 178 and move it from the latched position shown in FIG. 7 to its closed position, i.e., to its extreme left position where again upon turning of the tube 178, the pin 194 can lock with the sleeve in the valve closing position.

It will be understood that the relationship of the amount of sand and air entering the housing with respect to the amount of air, sand and debris withdrawn from the housing, is such that the surface to be cleaned, while cleaning, does not have a deposit of sand thereon.

While the form of embodiment herein shown and described constitutes preferred form, it is to be understood that other forms may be adopted [falling within the scope of the claims that follow].

We claim:

[1. Sandblasting mechanism, comprising in combination:

(A) walls, in combination with a surface to be cleaned, forming a closed housing, said housing having:

(1) a conduit of the type for conveying sand and air under pressure, extending through a wall of the housing, said conduit including a flexible portion in the housing and said flexible portion having an outlet end terminating in the housing;

(2) an opening forming an outlet for sand and air;

(3) a conduit for air for human breathing purposes extending through a wall of the housing;

(B) a breathing mask connected with the last mentioned conduit;

(C) air sealing means between the walls and the surface to be cleaned;

(D) a nozzle connected with the outlet of the first mentioned conduit;

(E) means for forcing air and sand through the first mentioned conduit and the nozzle;

(F) and means for exhausting air and sand through said outlet of the housing.]

[2. Sandblasting mechanism as defined in claim 1, characterized to include:

(G) a shielding skirt fastened to the walls and lying inwardly of the air sealing means.]

[3. Sandblasting mechanism as defined in claim 1, characterized in that the housing is formed of upright walls and a roof and that the surface to be cleaned is a floor.]

[4. Sandblasting mechanism as defined in claim 3, charterized to include:

(G) supports for the housing; and (H) means for raising and lowering the housing relative to the supports.]

[5. Sandblasting mechanism as defined in claim 4, charterized in that the supports are in the form of rollers.]

*6. Sandblasting mechanism as defined in claim 9, charterized to include:*

*(G) a second wall extending inwardly from the lower portion of another of the side walls and cooperating with another of said side walls to provide a second closed top passage, the lower edge of the second mentioned inwardly extending wall being spaced from the surface to be cleaned to provide a second outlet for air and sand from the interior of the housing to said passage, said second mentioned passage being connected with the second mentioned opening in the housing.*

*7. A portable sandblasting mechanism for cleaning floors, said mechanism comprising in combination:*

*(A) a housing including:*

*(1) upright surrounding walls, the lower edges of the walls adapted to be in sealing relationship with the floor to be cleaned by sandblasting,*

*(2) a roof joining the upright walls to form therewith a closed housing, said housing having:*

*(a) an opening for a conduit,*

*(b) an opening forming an outlet for sand and air;*

*(B) a conduit of the type for conveying sand and air under pressure extending through the first mentioned opening, said conduit having an outlet in the housing;*

*(C) a nozzle connected to the outlet of the conduit;*

*(D) means for exhausting air and sand through the second mentioned opening in the housing;*

*(E) means forming a horizontally extending passage adjacent one of the upright walls and the floor to be cleaned, the lower end of the means being spaced from the floor to provide an inlet to the passage, said passage terminating at and connected with the second mentioned in the housing whereby air and sand are withdrawn from the lower part of the housing.*

*8. A portable sandblasting mechanism as defined in claim 9, characterized in that the means forming the passage is in the form of a skirt lying inwardly of the lower portion of the upright walls.*

*9. Sandblasting mechanism, comprising in combination:*

*(A) side walls and a connecting top wall forming a closed housing when disposed above a surface to be cleaned, said housing having:*

*(1) air sealing means attached to the side walls and adapted to be in sealing relationship with the surface to be cleaned,*

*(2) an opening in one of the walls for a conduit;*

*(3) an opening in the lower portion of one of the side walls for the egress of air and sand;*

*(B) a wall extending inwardly from the lower portion of one of the side walls and cooperating with said one side wall to provide a closed top passage, the lower edge of said inwardly extending wall being adapted to be spaced from the surface to be cleaned to provide an outlet for air and sand from the interior of the housing to said passage, said passage being connected with the second mentioned opening in the housing;*

*(C) a conduit for air and sand extending through the first mentioned opening in the housing;*

*(D) means for forcing air and sand through the conduit;*

*(E) means for withdrawing air and sand from said passage through the second mentioned opening in the housing.*

References Cited

The following references, cited by the Examiner, are of record in the patented file of this patent or the original patent.

UNITED STATES PATENTS

| | | | |
|---|---|---|---|
| 821,776 | 5/1906 | Zoller | 51—8 |
| 1,676,576 | 7/1928 | Ruemelin | 51—8 |
| 2,684,558 | 7/1954 | Harris et al. | 51—8 |
| 2,935,820 | 5/1960 | Mead | 51—8 |
| 3,075,319 | 1/1963 | Blubaugh | 51—8 |

LESTER M. SWINGLE, Primary Examiner

UNITED STATES PATENT OFFICE
CERTIFICATE OF CORRECTION

Patent No. RE 27,314 Dated March 21, 1972

Inventor(s) Anthony E. Codina and George C. Punton

It is certified that error appears in the above-identified patent and that said Letters Patent are hereby corrected as shown below:

| | |
|---|---|
| line 39, | Column 1, cancel "an" and substitute --and--; |
| line 30, | Column 2, cancel "girders" and substitute --gliders--; |
| line 63, | Column 3, cancel "tube" and substitute --tubes--; |
| line 18, | Column 6, after "mentioned" insert --opening--. |

Signed and sealed this 11th day of July 1972.

(SEAL)
Attest:

EDWARD M.FLETCHER,JR.
Attesting Officer

ROBERT GOTTSCHALK
Commissioner of Patents

USCOMM-DC 60376-P69
☆ U.S. GOVERNMENT PRINTING OFFICE : 1969 O—366-334